May 15, 1934.                B. E. LENEHAN                1,958,895
                            VACUUM TUBE TESTER
                           Filed Jan. 14, 1933

WITNESSES:
R. J. Fitzgerald
F. J. Hicks

INVENTOR
Bernard E. Lenehan.
BY
ATTORNEY

Patented May 15, 1934

1,958,895

UNITED STATES PATENT OFFICE 1,958,895

VACUUM TUBE TESTER

Bernard E. Lenehan, Bloomfield, N. J., assignor to Westinghouse Electric & Manufacturing Company, East Pittsburgh, Pa., a corporation of Pennsylvania Application January 14, 1933, Serial No. 651,725

6 Claims. (Cl. 250—27)

My invention pertains to testing vacuum tubes to determine the operative condition thereof and more specifically it relates to a simplified method and apparatus wherein the circuits are all energized from an alternating current source.

The purpose of a testing device of the class to which my invention appertains is to enable dealers in vacuum tubes to check the tubes before selling them, thereby assuring the purchaser that he is getting good tubes and also protecting the manufacturer against the rejection of good tubes.

It is, accordingly, an object of my invention to provide a simple vacuum tube tester wherein all the circuits may be energized by alternating current.

A further object of my invention is to provide a vacuum tube tester energized by alternating current which may be simply operated to determine the anode current of a tube when different alternating current potentials are applied to the anode.

It is also an object of my invention to provide a vacuum tube tester energized by alternating current which may be simply operated to successively determine the anode current of a tube at different alternating current anode potentials and also to determine the total emission of the tube.

Figure 1:
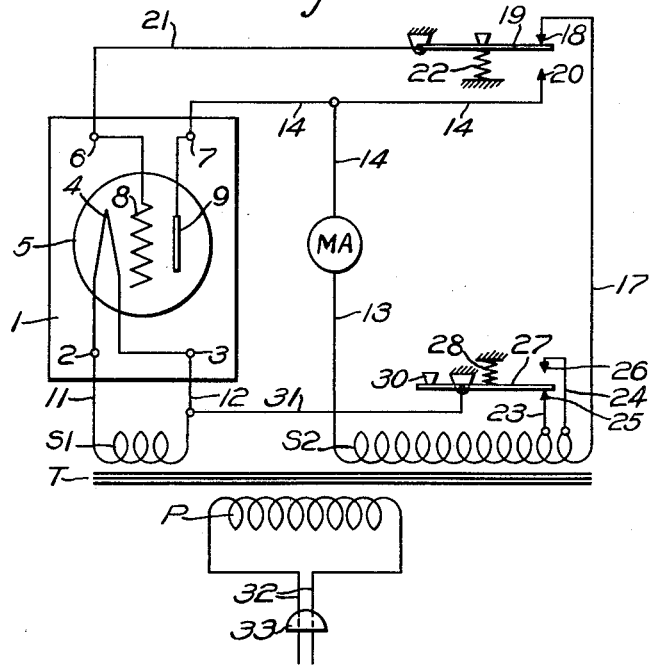
Figure 2:
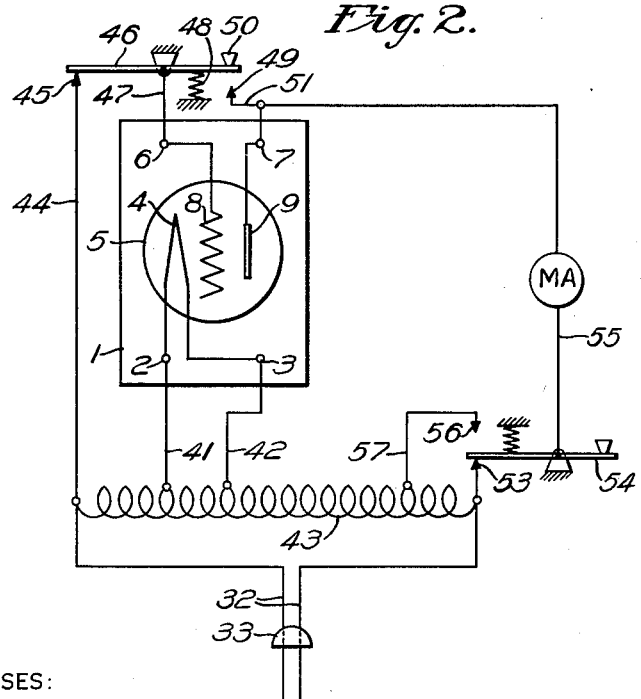

Other objects of my invention will become evident from the following detailed description, taken in conjunction with the accompanying drawing, in which Figure 1 is a schematic view diagrammatically representing one embodiment of my invention; and Fig. 2 is a similar view representing a modification thereof.

Referring more specifically to the drawing, the apparatus shown in Fig. 1 comprises a tube socket 1 for receiving a tube to be tested. The tube socket has terminals 2 and 3 which are adapted to be electrically connected to the filament 4 of a tube 5 which is plugged in for testing, and terminals 6 and 7 which are adapted to connect with the grid 8 and plate 9, respectively.

Heating current for the filament 4 is supplied from a secondary winding S1 of a transformer T which is connected to the socket terminals 2 and 3 by conductors 11 and 12 respectively.

An additional secondary winding S2 is provided on the transformer T for supplying suitable alternating current potentials for energizing the grid and plate of the tube under test. One terminal of this secondary winding S2 is connected to the plate 9 of the tube 5 through a conductor 13, a milliammeter MA, conductor 14 and the socket plate terminal 7.

The other terminal of the second winding S2 is connected to the grid 8 of the tube 5 by a circuit extending through a conductor 17, a stationary contact 18, a movable grid switch arm 19, conductor 21 and the socket grid terminal 6. A secondary stationary contact member 20 is disposed on the side of the switch arm 19 opposite from the other stationary contact 18, and is connected to the plate of the tube to conductor 14 and the socket plate terminal 7. The movable switch arm 19 is normally biased into engagement with stationary contact 18 by a biasing spring 22, but it may be manually depressed to engage contact 20.

The secondary winding S2 has intermediate taps 23 and 24 which are connected to stationary contacts 25 and 26 respectively disposed on opposite sides of a movable switch arm 27. A biasing spring 28 normally holds the switch arm 27 in operative engagement with the stationary contact 25. By manually depressing a button 30 on the opposite end of switch lever 27, the stationary contact 25 may be disengaged and contact 26 engaged, thereby selectively connecting the switch arm 27 with either transformer tap 23 or tap 24. The switch arm 27 is connected to one side of the filament of the tube through the conductors 31, 12 and the socket terminal 3. The primary winding P of the transformer may be provided with an extension cord 32 and plug 33 for conveniently plugging into any available alternating current service outlet in the well known manner.

In operation, the tube 5 to be tested is plugged into the socket 1 and the circuits are completed as shown. The filament is heated by current from the transformer secondary winding S1. During alternate half cycles the plate 9 goes positive and the grid 8 goes negative, since they are connected to opposite terminals of the secondary winding S2 through the circuits previously traced. The magnitude of the current flowing in the plate circuit during such half cycles is indicated by the instrument MA which is connected in the plate circuit. The magnitude of the current in the plate circuit depends upon the potentials applied to the grid and plate and the condition of the tube, and since the potentials are predetermined by the design and adjustment of the apparatus, the plate current is an indication of the condition of the tube.

Having observed the indication of the instrument MA, the operator depresses the button 30 on the end of the switch lever 27 thereby shifting the filament connection 31 from the transformer tap 25 to the tap 24 thereby increasing the potentials applied to the plate 9 of the tube, and decreasing the potentials applied to the grid 8, in a manner which will be readily understood. Larger positive potentials will now be applied to the plate of the tube and the corresponding negative potential applied on the grid will be decreased. Since these potentials are predetermined by the apparatus, the plate current as indicated by the instrument is indicative of the condition of the tube. In this manner, the tube is conveniently tested under two different conditions whereby the operator is readily informed of its operating condition.

To make a total emission test, the operator depresses the grid switch lever 19 thereby disconnecting the grid of the tube from its biasing potential source and connecting it directly to the plate.

In Fig. 2, I have shown an embodiment of my invention wherein various alternating current potentials may be applied to the plate of a tube to test it while a predetermined alternating current biasing potential is applied to the grid.

In accordance with this form of my invention, the filament terminals 2 and 3 of the socket 1 are connected to intermediate taps 41 and 42 on an auto transformer 43. One terminal of the coil 43 is connected to the grid 8 of the tube by a circuit which may be traced through a conductor 44, a stationary contact 45, a movable grid switch arm 46, and a conductor 47 to the socket terminal 6. A spring 48 normally biases the switch arm 46 into engaging relation with said stationary contact 45, but it may be manually disconnected therefrom and engaged with a second stationary contact 49 by depressing a button 50 thereon. The normally open stationary contact 49 is connected to the plate 9 of the tube through a conductor 51 and terminal 7 of the socket and affords a convenient means of making a total emission test by connecting the grid of the tube with its plate.

The opposite end of the coil 43 is connected to a stationary contact 53 disposed in engageable relation to a movable switch arm 54 which is connected to the plate of the tube through a conductor 55 which extends through an instrument MA to the plate terminal 7 of the socket. Since the grid 8 and the plate 9 are connected to opposite ends of the coil 43 and the filament 4 is connected to an intermediate portion of the coil, the grid will receive a negative biasing potential during the half cycles when the plate is positive. A second stationary contact 56 is disposed on the opposite side of the switch arm 54 and is connected to an intermediate tap 57 on the coil 43.

In operation, the attendant by moving the switch arm 54 is enabled to connect the plate 9 either to the end of winding 43 or to the tap 57 on the coil and thereby vary the alternating current potential applied to the plate of the tube, and conveniently take two different observations without changing the alternating current biasing potential on the grid.

To make a total emission test, the attendant manipulates the switch 46 and connects the grid of the tube to its plate.

It will be understood that it is within the scope of my invention to substitute non-inductive resistors instead of the coil 43 to divide the alternating current voltage. If desired, a multi-winding transformer or a plurality of transformers may be used for applying proper alternating current potentials to the elements of the tube.

Various different tubes may be tested by providing my tester with suitable sockets connected to apply proper alternating current potentials to the elements thereof, and the instrument MA may be a milliammeter or any suitable electro-responsive device.

Although I have shown and described certain specific embodiments of my invention, I am fully aware that many modifications thereof are possible. My invention, therefore, is not to be restricted except as necessitated by the prior art and the scope of the appended claims.

I claim as my invention:

1. In combination in a vacuum tube tester, a tube socket for receiving a tube to be tested, an alternating current source connected to the filament terminals of said socket for supplying heating current to the tube, a second alternating current source connected to the anode terminal of said socket, a third alternating current source connected to the grid terminal of said socket, a common return connection extending from said second and third alternating current sources to one of said filament terminals including manually actuable means for oppositely and simultaneously adjusting the alternating potentials applied to said grid and anode and an electro-responsive indicating device associated with said anode connection.

2. In combination in a vacuum tube tester, a tube socket for receiving a tube to be tested, an alternating current source connected to the filament terminals of said socket for supplying heating current to the test tube, a second alternating current source connected to the anode terminal of said socket, a third alternating current source connected to the grid terminal of said socket, a common return connection extending from said second and third alternating current sources to one of said filament terminals including manually actuable means for oppositely and simultaneously adjusting the alternating potentials applied to said grid and anode, an electro-responsive indicating device associated with said anode connection, and manually actuable means for interrupting said grid connection and connecting the grid terminal directly to the anode terminal.

3. In combination in a vacuum tube tester, means for applying alternating potentials to the filament, grid and anode of a tube to be tested including means for simultaneously adjusting the grid and the anode potentials, and electro-responsive indicating means associated with the anode.

4. In combination in a vacuum tube tester, means for applying alternating potentials to the filament, grid and anode of a tube to be tested including means for simultaneously adjusting the grid and the anode potentials, means operable to connect the grid of the tube to its anode, and electro-responsive indicating means associated with the anode.

5. In combination in a vacuum tube tester, means for applying alternating potentials to the filament, grid and anode of a tube to be tested including manually actuable means for simultaneously and oppositely adjusting the grid and anode potentials, manually operable means for connecting the grid to the anode, and electro-responsive indicating means associated with the anode.

6. The method of testing a vacuum tube which comprises applying alternating potentials to the filament, grid and anode, measuring the current in the anode circuit, simultaneously and oppositely adjusting the alternating potentials applied to the anode and grid, and again measuring the anode current.

BERNARD E. LENEHAN.